United States Patent Office 3,435,084
Patented Mar. 25, 1969

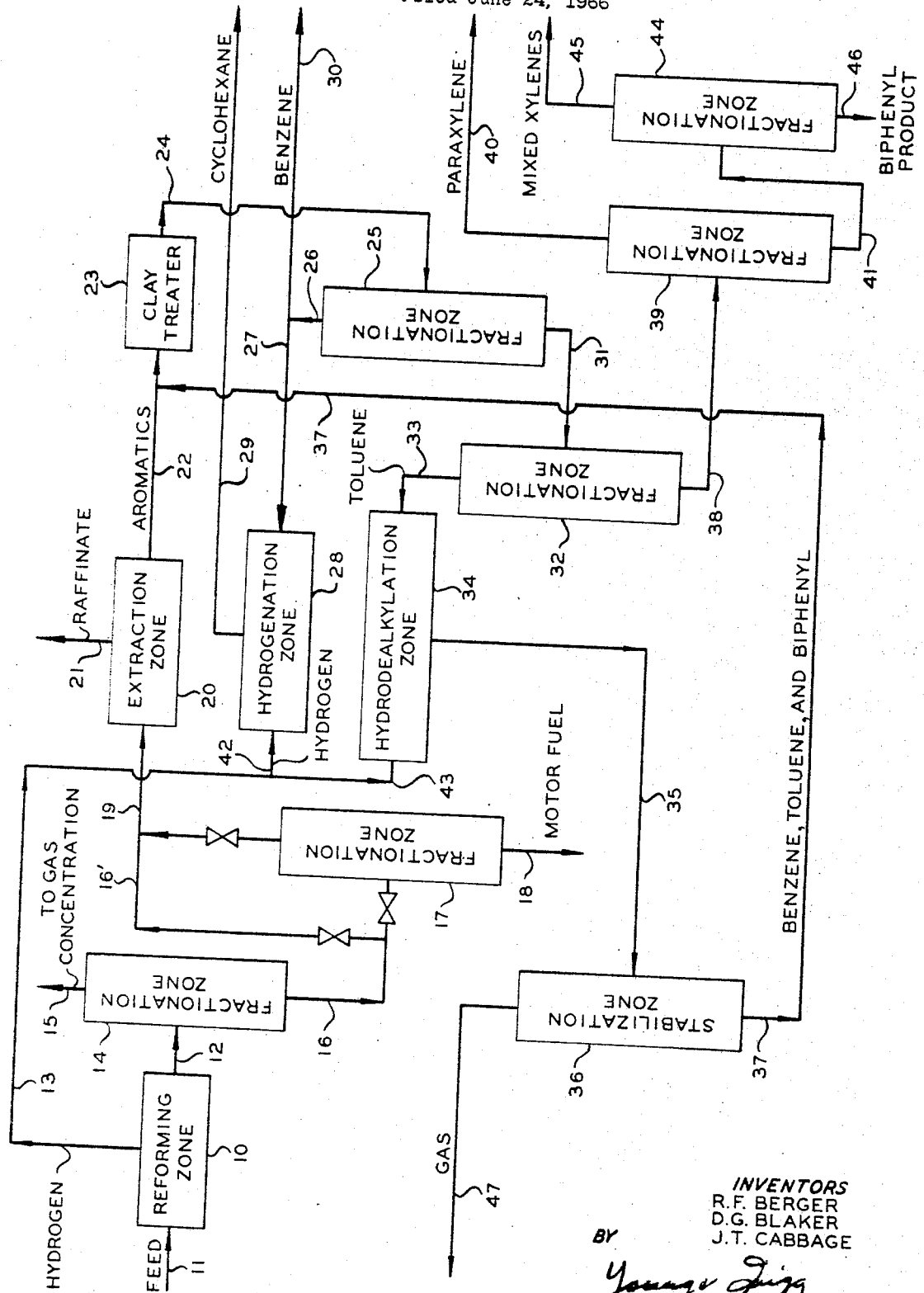

3,435,084
COMBINATION PROCESS WITH BIPHENYL PRODUCTION
John T. Cabbage, David G. Blaker, and Richard F. Berger, Bartlesville, Okla., assignors to Phillips Petroleum Company, a corporation of Delaware
Filed June 24, 1966, Ser. No. 560,175
Int. Cl. C07c 3/62, 3/00
U.S. Cl. 260—667                                    5 Claims

ABSTRACT OF THE DISCLOSURE

Production and recovery of biphenyl and other aromatics comprising recovering a concentrate of benzene, toluene and xylenes from a reformate formed from $C_6$–$C_9$ hydrocarbons, and recovering from the concentrate separate streams of benzene, which can be hydrogenated to cyclohexane, toluene, which can be hydrodealkylated to benzene, xylenes and biphenyl, and a $C_8$ aromatic fraction from which biphenyl can be separated.

---

This invention relates to process and apparatus for upgrading hydrocarbon mixtures. In one of its aspects, the invention relates to a novel combination of steps comprising reforming, fractionation, solvent extraction, hydrogenation and hydrodealkylation. In another aspect, the invention relates to the recovery of a benzene-toluene-xylene concentrate from a reformate and separating the concentrate into separate streams rich in benzene, toluene and xylenes, including biphenyl, which latter material can be recovered from the xylenes. In another aspect, the benzene and toluene streams recovered from the concentrate obtained from the reformate are hydrogenated and hydrodealkylated, respectively, in the presence of hydrogen recovered from the reforming operation.

Because of the rapid and relatively recent growth of the petrochemical industry, demand for certain bulk chemicals of relatively high purity has increased to the point where it is more economically attractive to produce these chemicals than others which were in former demand. Among these chemicals of present demand are benzene, toluene, cyclohexane, xylenes, and biphenyl. As known to the art, these chemicals are valuable, for example, as solvents, reaction media and polymer starting materials. There is a substantial need in the art for processes and apparatus suitable for producing increasing quantities of these name chemicals from commonly available refinery streams.

Accordingly, it is an object of this invention to provide process and apparatus for producing quantities of benzene, cyclohexane, toluene, xylenes and biphenyl.

It is another object of this invention to provide a novel combination of steps whereby commonly available refinery streams can be processed to produce increased quantities of relatively high purity benzene, cyclohexane, xylenes and biphenyl.

Other aspects, objects and the several adavntages of the invention will become apparent to one skilled in the art upon a study of this disclosure, drawing and the appended claims.

According to our invention, there is provided a process and apparatus for upgrading hydrocarbons which comprises recovering a benzene-toluene-xylene concentrate from a reformate formed from hydrocarbons having from 6 to 8 carbon atoms and separating the concentrate, preferably after clay treating, into separate streams rich in benzene, toluene, xylene and biphenyl by fractionation.

Further, according to the invention, benzene stream recovered from the benzene-toluene-xylene concentrate is hydrogenated to form cyclohexane.

Further, according to the invention, the toluene stream recovered from the benzene-toluene-xylene concentrate is hydrodealkylated to form benzene which is preferably recycled to the benzene-toluene-xylene concentrate for recovery and hydrogenation to cyclohexane.

Further, according to the invention, a $C_8$ and heavier aromatic stream recovered from the benzene-toluene-xylene concentrate is fractionated to recover xylenes and biphenyl. The xylenes then can be subjected to fractional crystallization to recover para-xylene as a product.

Further, according to the invention, a $C_6$–$C_9$ (having only minor amounts of $C_5$ and $C_{10}$ hydrocarbons therewith) hydrocarbon feed is subjected to reforming, preferably catalytic reforming, to produce a reformate which is fractionated into an overhead stream containing $C_5$ and lighter materials, a bottoms product which is suitable for motor fuel and a stream rich in aromatics which is subjected to solvent extraction to recover a benzene-toluene-xylene aromatic concentrate.

For a more complete understanding of our invention, reference is now made to the accompanying drawing which represents a schematic detail of a presently preferred form of our invention.

A feed, which can comprise $C_6$–$C_9$ hydrocarbons, including isohexane, is passed by way of line 11 through a reforming zone 10. A reformate comprising paraffins, naphthenes and aromatics, including benzene, toluene, and xylene, is removed from reforming zone 10 by way of line 12. The net hydrogen produced in reforming zone 10 is removed by way of line 13 and can be utilized later in the process as described hereinbelow. The reformate in line 12, removed from reforming zone 10, is passed to fractionation zone 14.

In fractionation zone 14, pentane and lighter materials are removed overhead by way of line 15 and can be passed to a gas concentration unit (not shown). A bottom product comprising depentanized reformate is removed from fractionation zone 14 by way of line 16 and passed to fractionator 17. In optional "trimmer" column 17, heavier materials comprising the kettle product are removed by line 18 and can be utilized, for example, as a gasoline or motor fuel blending stock. Overhead, comprising normal hexane, isohexanes, cyclohexane, methylcyclopentane, benzene, toluene and xylene product, is passed by way of line 19 to a solvent extraction zone 20. Preferably, depentanized reformate 16 is passed by way of 16' to extraction zone 20.

In extraction zone 20, feed stream 19 is separated into an aromatic extract or concentrate of benzene, toluene, and xylenes and a paraffin and naphthene containing raffinate removed by line 21. The benzene-toluene-xylene aromatic concentrate is removed from extraction zone 20 by way of line 22. The concentrate of benzene, toluene and xylenes is passed to clay treater 23 by way of line 22, along with stream 37, described hereinbelow.

An effluent comprising the clay treated benzene-toluene-xylene-biphenyl concentrate is removed by line 24 and passed to fractionation zone 25. In fractionation zone 25 an overhead benzene stream is removed by line 26 and can be passed by line 27 to hydrogenation zone 28, wherein benzene is converted to cyclohexane, removed by line 29. If desired, a portion of the overhead removed from fractionation zone 25 by way of line 26 can be passed by way of line 30 to further use as benzene per se.

A bottoms stream comprising toluene and $C_8$ aromatics, including xylene, and biphenyl is removed from fractionation zone 25 by way of line 31 and passed to a fractionator 32. Toluene is removed overhead from column 32 by way of line 33 and passed to hydrodealkylation zone 34 where in the toluene is converted at least in part to benzene and the effluent is removed from hydrodealkylation zone 34 by way of line 35 and passed to stabilizer 36. Light gases (hydrogen and methane principally) are removed overhead by line 47. A bottoms stream comprising benzene and unconverted toluene and produced biphenyl is removed from stabilizer 36 by way of line 37, above-referred to, and recycled to the benzene-toluene-xylenes concentrate in line 22 prior to introduction into clay treater 23.

A $C_8$ aromatic bottoms stream comprising xylenes and biphenyl is removed from fractionator 32 by way of line 38 and passed to fractionator 39, wherein the para-xylene rich stream is recovered overhead by line 40 and the mixed xylenes and biphenyl are recovered as bottoms by way of line 41. Para-xylene in line 40 can be passed to a fractional crystallization zone (not shown) wherein para-xylene is separated from accompanying ortho- and meta-xylenes. Stream 41 can be passed to a fractionator 44 wherein mixed xylenes are recovered overhead by line 45, and the biphenyl product is recovered by line 46 as bottoms product.

Hydrogen removed from reforming zone 10 by way of line 13 can be passed to hydrogenation zone 28 by way of line 42 and to hydrodealkylation zone 34 by way of line 43.

Feed materials which can be used in our invention include conventionally available refinery hydrocarbon streams comprising methylcyclopentane, benzene and cyclohexane, including normal hexane, isohexanes, $C_7$'s, $C_8$'s and $C_9$'s in the gasoline boiling range which may be therein.

Thus, it can be seen that according to the process of the invention, common refinery streams can be reformed, fractionated, solvent extracted, clay treated, hydrogenated and hydrodealkylated to produce benzene, cyclohexane, xylenes and biphenyl as products.

The hydrogenation, hydrodealkylation, solvent extraction, clay treating and reforming process can be any of those known in the prior art which would be chosen by one skilled in the art. For example, the hydrogenation process can be a catalytic process using a nickel and kieselguhr-type catalyst. The hydrodealkylation reaction can be thermal or catalytic (e.g., Hydeal), using a chromia-alumina type catalyst. The solvent extraction can be carried out using diethylene or triethylene glycol or sulfolane as the solvent. The reforming operation can be catalytic (e.g., Platforming), using a platinum or alumina type catalyst. These above-mentioned individual processes, per se, are well known in the art.

tion into a xylenes stream and biphenyl stream along with advantageous recycles of various streams.

We claim:
1. A process for the production and recovery of aromatic hydrocarbons which comprises
    (a) reforming a $C_6$–$C_9$ hydrocarbon containing mixture to produce an effluent reformate containing paraffins, naphthenes and aromatics, including benzene, toluene and xylenes,
    (b) fractionating the reformate obtained in step (a) to recover a pentane and lighter fraction as overhead and a heavier fraction suitable for motor fuel as bottoms and an intermediate fraction rich in benzene, toluene and xylenes as feed to solvent extraction,
    (c) solvent extracting the benzene-toluene-xylenes rich fraction to obtain a concentrate of these benzene, toluene and xylene aromatics,
    (d) fractionating the concentrate of benzene, toluene and xylene aromatics obtained in step (c) to recover separate streams consisting essentially of benzene, toluene and $C_8$ aromatics including xylenes and biphenyl,
    (e) hydrogenating at least a portion of the benzene stream recovered in step (d) to convert same to cyclohexane using therein a portion of the hydrogen from the reforming step,
    (f) hydrodealkylating the toluene stream recovered in step (d) using therein a portion of the hydrogen recovered from the reforming step and forming an effluent comprising benzene, toluene and biphenyl,
    (g) passing at least a portion of the hydrodealkylation effluent obtained in step (f) and combining with the benzene-toluene-xylenes concentrate obtained in step (c), and
    (h) separating substantially pure biphenyl from the $C_8$ stream recovered in step (d) as a product of the process.

2. A process according to claim 1 wherein the hydrodealkylation effluent is stabilized by removing light components therefrom prior to combining with the benzene-toluene-xylenes concentrate.

3. A process according to claim 1 wherein the benzene-toluene-xylenes concentrate obtained in step (c) is clay treated following combining with the hydrodealkylation effluent.

4. A process according to claim 1 wherein the benzene-

SPECIFIC EXAMPLE.—BARRELS/DAY (INCLUDING RECYCLES)

| Stream Component | 11 | 19 | 27 | 29 | 33 | 37 | 30 | 40 | 41 | 46 |
|---|---|---|---|---|---|---|---|---|---|---|
| Isopentane |  | 66 |  |  |  |  |  |  |  |  |
| n-Pentane | 367 | 158 |  |  |  |  |  |  |  |  |
| $C_6$-Paraffins | 5,239 | 3,818 |  |  |  |  |  |  |  |  |
| Methylcyclopentane | 995 | 367 |  |  |  |  |  |  |  |  |
| Cyclohexane | 995 | 31 |  | 2,985 |  |  |  |  |  |  |
| Benzene | 380 | 2,984 | 2,467 |  |  | 4,235 | 3,122 |  |  |  |
| $C_7$-Paraffins | 6,420 | 2,812 |  |  |  |  |  |  |  |  |
| $C_7$-Naphthenes | 4,090 | 439 |  |  |  |  |  |  |  |  |
| Toluene | 1,170 | 5,386 |  |  | 5,939 | 574 |  |  |  |  |
| $C_8$-Paraffins | 4,430 | 1,174 |  |  |  |  |  |  |  |  |
| $C_8$-Naphthenes | 4,130 | 190 |  |  |  |  |  |  |  |  |
| Ethyl Benzene | 300 | 1,126 |  |  |  |  |  | 1,124 |  |  |
| Para-Xylene | 334 | 1,150 |  |  |  |  |  | 1,148 |  |  |
| Meta-Xylene | 774 | 2,916 |  |  |  |  |  | 2,912 |  |  |
| Ortho-Xylene | 352 | 1,333 |  |  |  |  |  | 1,331 |  |  |
| $C_9$+-Paraffins | 1,575 | 420 |  |  |  |  |  |  |  |  |
| $C_9$+-Naphthenes | 1,260 | 10 |  |  |  | 47 |  | 1,893 | 80 |  |
| $C_9$+-Aromatics | 315 | 1,872 |  |  |  | 140 |  | 140 | 140 | 140 |
| Biphenyl |  |  |  |  |  |  |  |  |  |  |
| Total |  | 33,126 | 26,252 | 2,467 | 2,985 | 5,939 | 4,996 | 3,122 | 8,548 | 220 | 140 |

Reasonable variation and modification are possible within the scope of the foregoing disclosure, the drawing and the appended claims to the invention, the essence of which is that there are provided process and apparatus for upgrading mixed hydrocarbons comprising a combination of a steps of reforming, solvent extraction of the reformate, separation and hydrogenation and hydrodealkylation of the benzene and toluene fractions of the resulting extract phase to produce high purity aromatics and naphthenes, and separation of a $C_8$ aromatic fractoluene-xylenes concentrate obtained in step (c) is clay treated and then separated according to step (d) as follows
    (I) fractionating said clay treated benzene toluene-xylenes concentrate to recover benzene overhead and toluene and $C_8$ aromatics including xylenes and biphenyl as bottoms, and
    (II) fractionating said bottoms obtained in (I) to separately recover toluene, xylenes and biphenyl.

5. A process according to claim 4 further comprising subjecting said bottoms obtained in (I) to fractionation wherein toluene is taken overhead and passed to hydrodealkylation and the bottoms comprising xylenes and biphenyl is passed to further fractionation wherein xylenes are recovered overhead and biphenyl as bottoms as product.

References Cited

UNITED STATES PATENTS

| | | | |
|---|---|---|---|
| 2,739,993 | 3/1956 | Schneider et al. | 260—667 |
| 2,988,575 | 6/1961 | Hays et al. | 260—674 |
| 3,166,490 | 6/1965 | Evans | 208—96 |
| 2,768,986 | 10/1956 | Johnson et al. | 208—96 |
| 3,296,323 | 1/1967 | Myers et al. | 260—672 |
| 3,169,151 | 2/1965 | Merryfield et al. | 260—667 |

FOREIGN PATENTS 718,909   11/1959   Great Britain.

DELBERT E. GANTZ, *Primary Examiner.*

J. D. MYERS, *Assistant Examiner.*

U.S. Cl. X.R.

260—666, 668